Figure 1:
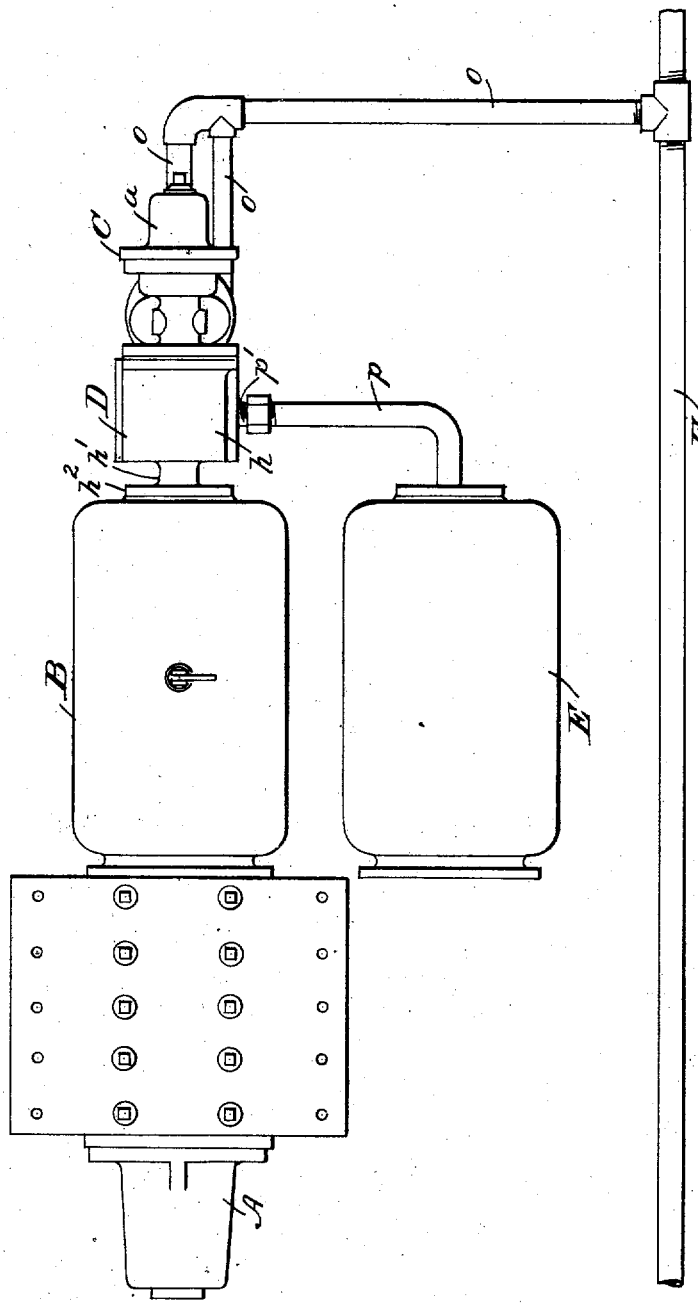

No. 12,680. REISSUED AUG. 13, 1907.

L. KRIMMELBEIN.

QUICK ACTION AUTOMATIC RELEASE MECHANISM FOR AIR BRAKES.

APPLICATION FILED FEB. 21, 1903.

4 SHEETS—SHEET 1.

WITNESSES:

J. Custer

Jas. B. MacDonald.

INVENTOR,

Leopold Krimmelbein

By E. Wright

Att'y.

THE NORRIS PETERS CO., WASHINGTON, D. C.

No. 12,680. REISSUED AUG. 13, 1907.

L. KRIMMELBEIN.

QUICK ACTION AUTOMATIC RELEASE MECHANISM FOR AIR BRAKES.

APPLICATION FILED FEB. 21, 1903.

4 SHEETS—SHEET 2.

WITNESSES:

J. S. Custer

Jas. B. MacDonald.

INVENTOR,

Leopold Krimmelbein

By E. A. Wright

Att'y.

THE NORRIS PETERS CO., WASHINGTON, D. C.

No. 12,680. REISSUED AUG. 13, 1907.

L. KRIMMELBEIN.

QUICK ACTION AUTOMATIC RELEASE MECHANISM FOR AIR BRAKES.

APPLICATION FILED FEB. 21, 1903.

4 SHEETS—SHEET 3.

WITNESSES:

J. L. Custer

Jas. B. MacDonald.

INVENTOR,

Leopold Krimmelbein

By E. J. Wright Att'y.

THE NORRIS PETERS CO., WASHINGTON, D. C.

No. 12,680. REISSUED AUG. 13, 1907.

L. KRIMMELBEIN.

QUICK ACTION AUTOMATIC RELEASE MECHANISM FOR AIR BRAKES.

APPLICATION FILED FEB. 21, 1903.

4 SHEETS—SHEET 4.

WITNESSES:

J. Custer

Jas. B. MacDonald.

INVENTOR,

Leopold Krimmelbein

By E. Wright

Att'y.

THE NORRIS PETERS CO., WASHINGTON, D. C.

UNITED STATES PATENT OFFICE.

LEOPOLD KRIMMELBEIN, OF BALTIMORE, MARYLAND, ASSIGNOR, BY DIRECT AND MESNE ASSIGNMENTS, TO THE WESTINGHOUSE AIR BRAKE COMPANY, OF PITTSBURG, PENNSYLVANIA, A CORPORATION OF PENNSYLVANIA.

QUICK-ACTION AUTOMATIC RELEASE MECHANISM FOR AIR-BRAKES.

No. 12,680. Specification of Reissued Letters Patent. Reissued Aug. 13, 1907.

Original No. 715,083, dated December 2, 1902. Application for reissue filed February 21, 1903. Serial No. 144,533.

*To all whom it may concern:*

Be it known that I, LEOPOLD KRIMMELBEIN, a citizen of the United States, residing at Baltimore, State of Maryland, have invented certain new and useful Improvements in Quick-Action Automatic Release Mechanism for Air-Brakes, of which the following is a specification.

This invention relates to valve mechanism for railway air-brake systems.

The standard triple valve in use at the present time for long trains is capable of three distinct operations—namely, first, a service application of the brakes by a slight reduction of pressure in the train-pipe to apply the brakes by auxiliary-reservoir pressure only; second, an emergency application of the brakes with full force by a great and rapid reduction of pressure in the train-pipe to apply the brakes by both auxiliary-reservoir pressure and train-pipe pressure, and, third, a release of the brakes by increasing the pressure in the train-pipe. It is with this last-named operation of the triple valve that this invention has principally to do.

The locomotive of a train carries a large main reservoir filled wth air under pressure by means of an air-pump, said main reservoir supplying the air to the train-pipe and thence to the auxiliary reservoir of each car of the train. When the brakes have been applied either for service or emergency and the engineer throws his engineer's valve to release position, air under pressure from the main reservoir on the engine will increase the pressure in the train-pipe and move the pistons of the various triple valves of the train to a position so that air will exhaust from the brake-cylinders and the brakes will be released. As the main reservoir is carried by the locomotive and the increase or restoration of pressure in the train-pipe to effect the release of the brakes starts at the locomotive and travels rearwardly along the train to the triple valve of each car it is evident that with the same or standard piston travel on all the triple valves the locomotive-brakes will be released first, the tender-brakes second, and so on in succession throughout the train, and it has sometimes happened, especially with a long train, that the increase of air-pressure in the train-pipe, while it is sufficient to quickly release the locomotive brakes and the brakes of the cars composing the forward portion of the train, is insufficient to quickly release the brakes of the cars composing the rear portion of the train, owing to the zigzag construction of the train-pipe and the resistance thereby caused and also owing to the fact that the feed or charging grooves of the triple valves at the forward part of the train will use up the train-pipe air before it can act on the cars at the rear of the train. The consequence is that the brakes of the cars at the front of the train are often released while those at the rear are still applied, and this often causes the train to part at some point, resulting in delay and damage to the equipment.

It is the principal object of this invention to provide means whereby the train-pipe pressure acting to release the brakes can never become so depleted at any point in the train as to fail to effect a quick release of the brakes and whereby the brakes on all the cars of a train can be released so quickly and in such quick succession as to be practically simultaneous.

A further object of the invention is to provide means which will enable the engineer to recharge the auxiliary reservoirs of the several cars of the train to nearly the maximum pressure while the brakes are in the applied position without releasing the brakes; and a further object of the invention is to provide means for effecting the results before named, which means will not interfere in any way with the usual actions of the triple valve to apply the brakes for service or for emergency and which will not necessitate any change in the construction of the ordinary triple valve in use at the present time.

The invention consists in certain constructions, arrangements, and combinations of the parts hereinafter fully described and claimed, reference being had to the accompanying drawings, in which—

Figure 2:
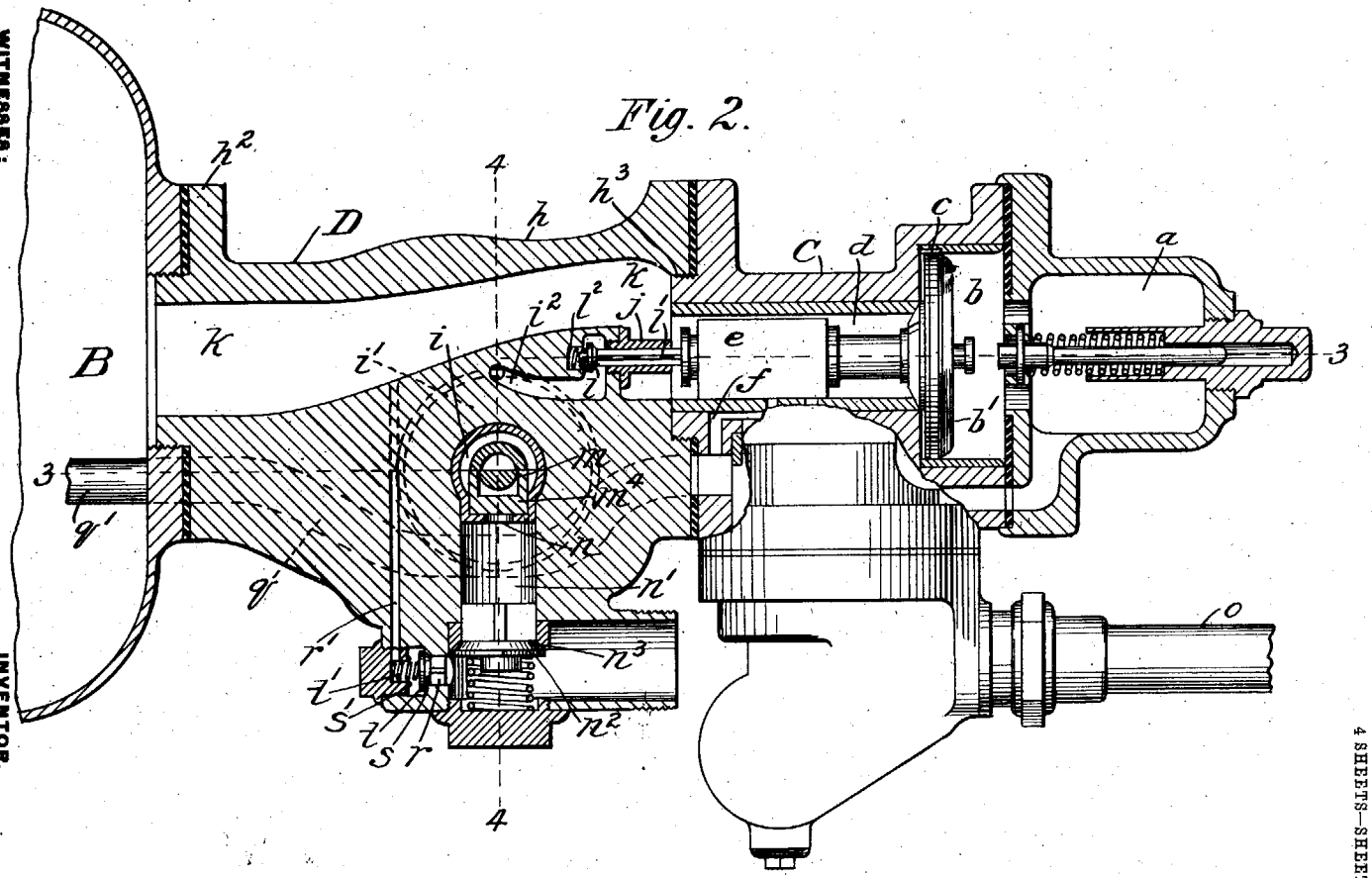
Figure 3:
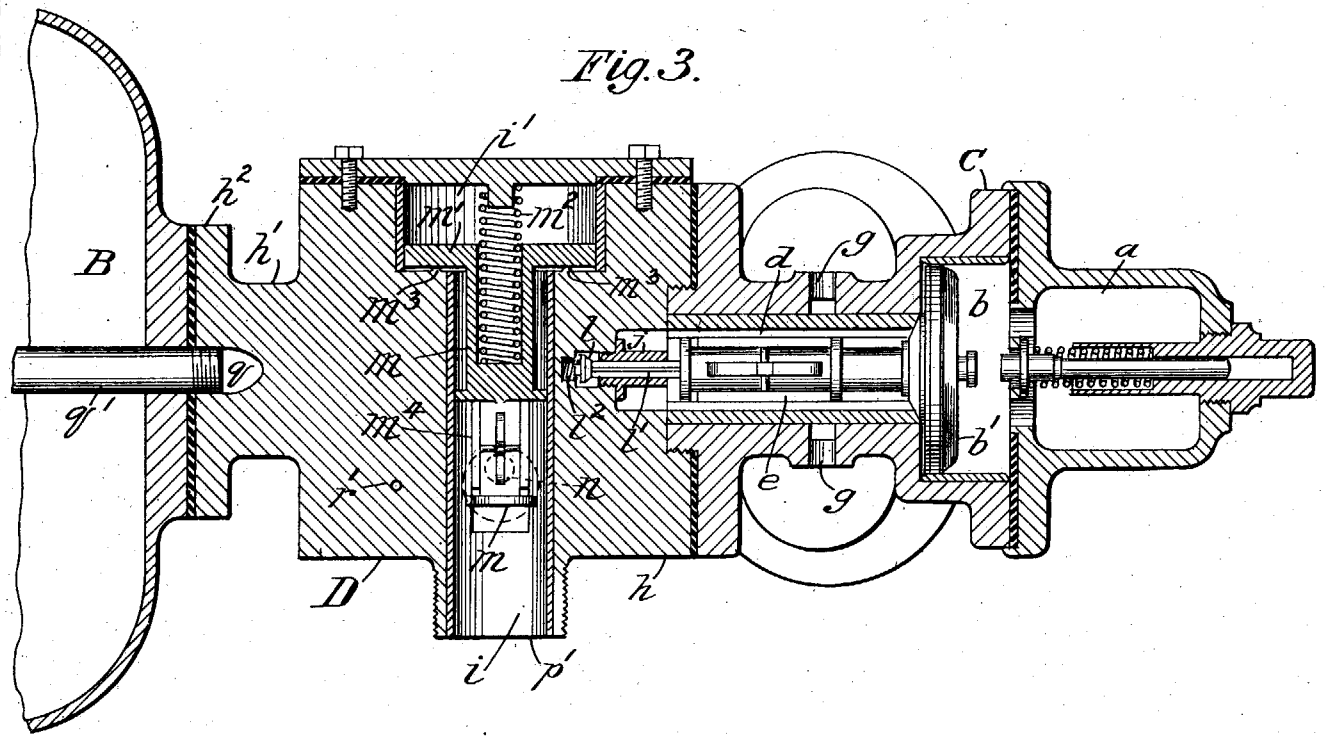
Figure 4:
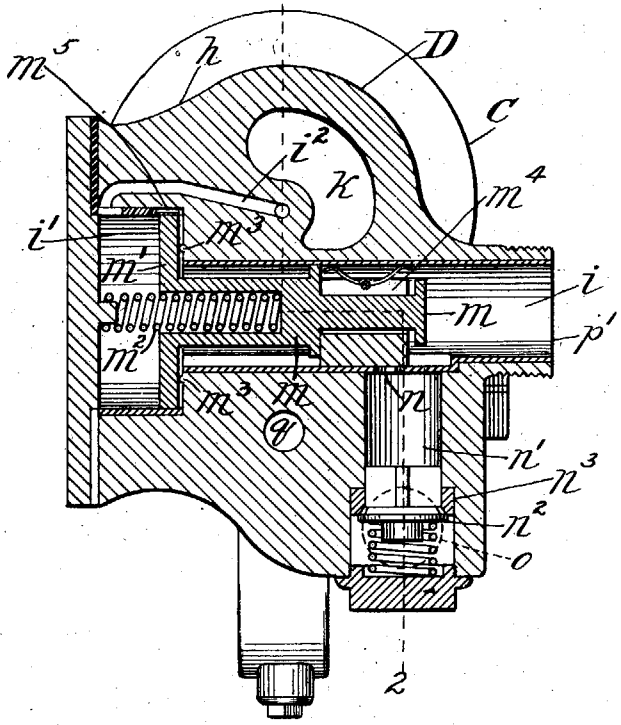

Figure 1 is a top plan view of a brake-cylinder, auxiliary reservoir, and quick-action triple valve of a freight-car equipment with my automatic quick-action release devices applied. Fig. 2 is a longitudinal vertical section of a portion of the auxiliary reservoir, the valve mechanism of the automatic quick-action release, and triple valve, the section being taken approximately on the line 2 2 of Fig. 4. Fig. 3 is a horizontal section of the same, taken approximately on the line 3 3 of Fig. 2. Fig. 4 is a transverse vertical section on the line 4 4 of Fig. 2 and looking toward the triple valve.

Referring to the drawings, more especially Fig. 1, the letter A designates the brake-cylinder; B, the auxiliary reservoir; C, the triple valve; D, the valve mechanism of the quick-action release device; E, a supplemental reservoir employed on each car in connection with the said quick-action release, and F the train-pipe leading from the main reservoir on the locomotive to the triple valve and also to the said quick-action release-valve mechanism.

Referring now particularly to Figs. 2 and 3, the triple valve C has the usual train-pipe chamber *a*, through which air passes to and from the piston-chamber *b* to act on the head of the triple-valve piston *b'*. A bushing in said piston-chamber has the usual feeding or charging groove *c*, through which train-pipe air is fed to the valve-chamber $d$ and thence to the auxiliary reservoir B when the piston $b'$ is in the release position. As is well known, the valve-chamber $d$ has three ports. One of said ports communicates with a passage $f$, leading to the brake-cylinder A, another communicates with the piston of the emergency-valve, and the remaining port communicates with the exhaust-passage $g$, leading to the atmosphere through the triple-valve casing.

Those versed in the art of air-brakes are aware that in the operation of triple valves a reduction of pressure in the train-pipe by the proper manipulation of the engineer's valve, for instance, will reduce the maximum air-pressure in the train-pipe air-chamber $a$ and behind the piston $b'$, and there being the maximum pressure in the auxiliary reservoir B and valve-chamber $d$ the piston $b'$ will move back and carry with it the slide-valve $e$, which governs the just-mentioned ports of the chamber $d$. This movement of the slide-valve uncovers the port for service application and admits air from the auxiliary reservoir B to the brake-cylinder A, or if the said train-pipe reduction is great enough the slide-valve will uncover both the service and emergency ports and will admit air to the brake-cylinder both from the auxiliary reservoir B and the trainpipe F. Then in order to release the brakes air-pressure is increased in the train-pipe F, and the piston $b'$ moves the slide-valve forwardly again to close the said ports and uncover the exhaust-port to exhaust the air from the brake-cylinder; but in the case of a long train, and especially when the train-pipe pressure has been depleted by an emergency application, engineers have heretofore often found that they have not at their control sufficient air-pressure in the main reservoir on the engine to restore the train-pipe pressure quickly, more especially at the rear of the train, and the brakes at the rear of the train cannot, therefore, be quickly released. Then, again, after the brakes have been applied for a short period it has been found that the brake-shoes gradually tighten their grip on the wheels, owing to leakage at the hoes-couplings or other parts of the train-pipe, and the train will either come to a full stop when a full stop is not intended, or the brakes must be fully released and all the air-pressure in the brake-cylinders wasted (owing to the faulty construction of the hand retaining-valves) before the auxiliary reservoirs can be recharged for another application of the brakes, and, moreover, when a road-engine is cut off from a train and replaced by a shifting-engine the latter cannot handle the cars until all the auxiliary reservoirs are emptied, owing to the aforementioned leakage in the train-pipe and the consequent application of the brakes; but with the device of my invention this difficulty is avoided, and the said train can be handled by a shifting-engine after only one of the auxiliary reservoirs is bled or reduced to the atmosphere or elsewhere than to the brake-cylinder sufficiently to establish a release of the brakes on one car, as the brakes on all the cars will then automatically release, as hereinafter explained As before stated, it is one of the objects of this invention to provide means whereby any of the triple valves in use to-day—such, for instance, as the Westinghouse quick-action triple valve illustrated in the accompanying drawings—may be prevented from releasing the brakes while the auxiliary reservoirs are being recharged and whereby when it is desired to release the brakes a quick-action release on all the cars of the train may be effected.

It is deemed expedient to first describe the device of this invention in its relation to its function of quickly releasing the brakes and then to describe it in its relation to its function of recharging both the auxiliary reservoirs and supplemental reservoirs employed.

The device of my invention is provided with a cylindrical valve-casing $h$, having at one side a tubular extension $h'$, whose head $h^2$ is bolted to the head of the auxiliary reservoir B. The opposite side of said valve-casing is provided with a screw-threaded opening $h^3$, into which is screwed the triple-valve casing, as shown in Figs. 2 and 3. The said valve-casing $h$ is also provided with a release-valve chamber $i$, extending horizontally in a direction at right angles to the triple-valve chamber $d$ and provided at one end with an enlarged chamber $i'$, which communicates with the triple-valve chamber $d$ by means of a passage $i^2$, extending from the piston-head end of the release-valve chamber $i$, through a valve-seat $j$ into the piston-stem end of the triple-valve chamber $d$, and consequently also communicating with a passage $k$, which extends over the release-valve chamber $i$, and from the triple-valve chamber to the auxiliary reservoir B, as indicated in Fig. 2. A puppet-valve $l$ is provided with a non-circular or winged stem $l'$, which extends through the valve-seat $j$ into the triple-valve chamber $d$, and a spring $l^2$ bears against said valve-seat, whereby to close communication between the triple-valve chamber $d$, auxiliary reservoir B, and the enlarged end $i'$ of the release-valve chamber $i$. A piston-stem $m$ works in the release-valve chamber $i$ and is provided at one end with a head $m'$, moving in the enlarged end $i'$ of said chamber. A spring $m^2$ bears against the head end of said piston and tends to move the latter so that its head will abut against small lugs $m^3$ on the wall of the chamber $i$, and a slide-valve $m^4$ is mounted with a limited movement on the other end of said piston-stem, said slide-valve governing a port $n$ for a purpose hereinafter described. The air-pressure is equalized on both sides of the piston-head $m'$ by means of a passage $m^5$. (Shown in Fig. 4.) The train-pipe F is provided with a branch pipe $o$, which leads both to the train-pipe air-chamber $a$ of the triple valve C and to a vertically-extending passage $n'$ in the lower side of the release-valve casing $h$, and the release-valve chamber $i$ communicates at the slide-valve end of the release-valve piston-stem $m$ with a pipe $p$, joined to a nipple $p'$ and leading from the supplemental reservoir E, one of which is secured underneath each car alongside of the auxiliary reservoir B. The port $n$, just mentioned, establishes communication between the vertical passage $n'$, the train-pipe branch $o$, and the supplemental-reservoir pipe $p$, and an upwardly spring pressed check-valve $n^2$ seats against a valve-seat $n^3$ in the said passage $n'$, so that while the air-pressure is permitted to pass from the supplemental reservoir E to the train-pipe F it is prevented from flowing from the latter to the former. A passage $q$ in the release-valve casing $h$ extends underneath the valve-chamber $i$ to connect the passage $f$ with the pipe $q'$, which extends through the auxiliary reservoir into the brake-cylinder.

In the operation of the device in its relation to the quick releasing of the brakes it is to be understood that there is a supplemental reservoir E under each car equipped with my device and that each supplemental reservoir is filled with air under maximum pressure equal to the maximum pressure of the auxiliary reservoir. When the air-pressure in the train-pipe F is reduced to apply the brakes for service, the triple-valve piston-stem moves backwardly, as before described, and away from the puppet-valve stem $l'$, permitting the puppet-valve $l$ to remain close against its seat $j$. At the same time the service-port of the triple valve is opened by the triple slide-valve, and air from the auxiliary reservoir passes to the brake-cylinder, or if an emergency application is made air from the train-pipe F will pass, together with the auxiliary-reservoir air, into the brake-cylinder. After either a service or emergency application has been made the air-pressure in the auxiliary reservoir B, auxiliary-reservoir passage $k$, and triple-valve chamber $d$ is of course reduced below the maximum pressure, while, on the other hand, the quick-action release device is unaffected, and there still remains in the supplemental reservoir E and in the release-valve chamber $i$ on both sides of the piston-head $m'$ the maximum air-pressure, equal to the normal train-pipe pressure and which may be substantially the same as that carried in the main reservoir; but when the air-pressure in the train-pipe F is increased to release the brakes the stem of the triple-valve piston $b'$ will strike against the puppet-valve stem $l'$ and hold the puppet-valve $l$ off its seat $j$. Instantly communication is established between the triple-valve chamber $d$ with its reduced pressure and the enlarged end $i'$ of the release-valve chamber $i$ by means of the passage $i^2$, and thereupon the piston-head $m'$ and stem $m$ will move rearwardly, carrying with them the slide-valve $m^4$, which latter will uncover the large port $n$, and thus allow the air under maximum pressure in the supplemental reservoir to flow into the train-pipe F, whereby to quickly restore pressure in the same, so as to act instantly on the triple valve of the next car in the rear of the car equipped with my quick-action release device. At the same time communication is established between the release valve chamber $i$ and the passage $i^2$, since the port from the passage $i^2$ through the bushing of chamber $i'$ is longer than the thickness of the piston $m'$ which now occupies the position at the outer end of its chamber, so that air will flow from the supplemental reservoir E past the quick-action release-piston $m'$ and through the passages $i^2$ and $k$ into the auxiliary reservoir and effect a full equalization of pressure between the supplemental reservoir, auxiliary reservoir, and train-pipe, so that another application can be made immediately thereafter. Heretofore it has not been possible to make a service application immediately after the release of a long train, owing to the overcharging of the train-pipe of the cars at the front of the train in the action of releasing the brakes at the rear of the train. Hence it will be seen that in a long train whose cars are equipped with the said device any car—say the fiftieth car—does not depend upon the air-pressure in the main reservoir on the locomotive to restore the pressure in its respective section of train-pipe in order to release the brakes, but depends on the supplemental reservoir of the car immediately in front of it, and therefore a quick release of the brakes on all the cars is insured, or if only sundry of the cars of the train are equipped with the said device each car so equipped will serve to quickly release the brakes of the car or cars in the rear of it. Moreover, with the device of my invention the main reservoir may be considerably reduced in size, as it will not be depended upon to restore the air-pressure in the train-pipe of the entire train, and the air-pump will not have to be worked so constantly as is now the case, thereby economizing by increasing the life of the pump.

I shall now describe the construction by means of which the auxiliary reservoir B may be recharged while the brakes are in the applied position.

In the lower side of the release-valve casing $h$ (see Fig. 2) is an opening $r$, communicating with the passage $n'$ below the check-valve $n^2$, and therefore also with the train-pipe F, and from said opening $r$ a passage $r'$ extends upwardly and opens into the passage $k$, leading to the auxiliary reservoir B. The said opening $r$ is provided with two valve-seats $s$ $s'$, which face each other, and between said two valve-seats is mounted a valve $t$, normally pressed by a spring $t'$ against that valve-seat $s$ which is adjacent the passage $n'$, as indicated in Fig. 2. The opening through the last-named valve-seat $s$ is about twice the area of that through its opposing valve-seat $s'$, so that the amount of air-pressure just sufficient to move the valve $t$ off the larger valve-seat $s$ will not close said valve against the smaller valve-seat. Now when it is desired to recharge the auxiliary reservoir while the brakes are in the applied position the engineer brings his engineer's valve to the "running" position, whereupon the triple-valve piston $b'$ will move toward the release position just far enough to take up the lost motion between its stem and the slide-valve and to close the graduating-port in the said valve, but not far enough ordinarily to move the slide-valve itself, owing to the air-pressure acting against the top and sides of the slide-valve to hold the latter to its seat. If, for any reason, the movement of the triple valve piston should be sufficient to cause the slide valve to move toward release position, it would stop at the point where the stem of the triple valve piston comes into contact with the puppet-valve stem $l'$, and would not open the puppet-valve $l$ owing to the force of the air pressure acting on the back of said puppet-valve and holding the same against its seat. With the parts in either of the positions just described the exhaust port is closed, and the engineer may feed air into the train-pipe F gradually, and such air will unseat the recharging-valve $t$ and will pass around the latter and thence up through the passage $r'$ into the auxiliary reservoir while the brakes are still in the applied position.

If the air-pressure in the main reservoir should happen to be higher than the air-pressure in the auxiliary reservoir and supplemental reservoir when the brakes are in the full-release position, the check-valve $n^2$ will prevent the air-pressure in the train-pipe from passing into the passage $n'$ and from raising the release slide-valve $m^4$ off its seat to allow grit to get under said valve.

The principal objection to the use of any devices for recharging the auxiliary reservoirs while the brakes remain applied has heretofore been found to be the great difficulty encountered in releasing the brakes after such recharging, due to the fact that the effective excess pressure in the main reservoir, which is depended upon to move the triple valves to release position, is diminished by the amount of the recharging and although this excess pressure is always sufficient to release a few of the triple valves on the front end of a train, it has been found impossible on long trains to release the brakes on the rear cars.

With my improved quick-action release mechanism, however, used in connection with the recharging valve device it will be seen that there will be no difficulty in releasing even if the auxiliary reservoirs should be recharged nearly up to normal train-pipe pressure since it is only necessary to have sufficient pressure in main reservoir to move the first triple valve in the train to release position when all of the others will immediately release automatically as before described.

The recharging valve device will also operate automatically to supply any small leaks in any of the auxiliary reservoirs during the time that the brakes are applied, and this is also a very important feature of my improvement, since, if one of said reservoirs should leak sufficiently to cause its triple valve to move to release position during the time that it was intended to hold the brakes applied, it is evident that all the brakes would immediately be released; but by using the recharging valve device with the quick-action release mechanism any such small leaks in auxiliary reservoirs are supplied automatically from the train-pipe, thereby preventing the movement of any triple valve to release position while the brakes remain applied. If, however, a sudden and excessive reduction of pressure is made in one of the auxiliary reservoirs, such as bleeding the reservoir to the atmosphere, while the brakes are applied, the recharging valve will close against its smaller seat and the triple valve will be moved to release position, thus releasing all the brakes by means of the quick action release mechanism.

It will therefore be apparent that the combination of the recharging valve device with the quick-action release mechanism is an important one in practice and the same is hereinafter broadly claimed.

It is also obvious that the quick-action release mechanism may be operated by itself and while I have shown and described one such form of valve mechanism operated by an increase of train-pipe pressure, or the movement of the triple valve to release position, for establishing communication from the supplemental reservoir to the train-pipe, my invention is not limited to any particular means since various forms of valve mechanism operated by the usual increase of train-pipe pressure for releasing the brakes could readily be designed for opening communication from the supplemental reservoir to train-pipe and which would be included within the scope of my invention.

Having thus described my invention, what I claim as new, and desire to secure by Letters Patent, is—

1. In a railway air-brake system, the combination with the triple valves and train-pipe, of a release-valve mechanism; a supplemental reservoir connected with the train-pipe through the instrumentality of said release-valve mechanism; and means whereby the piston-stem of the triple valve, upon moving to release position will actuate said release-valve mechanism to open communication between said supplemental reservoir and train-pipe, as set forth.

2. In a railway air-brake system, the combination with a triple valve, train-pipe, and auxiliary reservoir, of a release-valve mechanism provided with a passage which leads from the auxiliary reservoir to the triple valve; a supplemental reservoir connected with the train-pipe through the instrumentality of the said release-valve mechanism; and means whereby the release action of the triple valve will cause the reduced air-pressure in the auxiliary reservoir to act on the valve of the release-valve mechanism and thereby establish communication between the supplemental reservoir and the train-pipe, as set forth.

3. In a railway air-brake system, the combination with a triple valve, train-pipe, and auxiliary reservoir, of a release-valve mechanism provided with a passage which leads from the auxiliary reservoir to the slide-valve end of the triple-valve piston-stem, and also provided with a valve and a passage leading from one side of said valve to the said slide-valve end of the triple-valve piston-stem; a puppet-valve opening and closing said last-named passage and adapted to be opened by said triple-valve piston-stem when the latter moves to the release position; and a supplemental reservoir connected with the train-pipe through the instrumentality of said release-valve mechanism, whose valve establishes communication between said supplemental reservoir and train-pipe, as set forth.

4. In a railway air-brake system, the combination with a triple valve, train-pipe, and auxiliary reservoir, of a valve-casing, *h*, provided with a valve-chamber, a valve therein, and passages leading from one side of said valve to the auxiliary reservoir; a puppet-valve opening and closing the communication effected by said passages and arranged to be opened by the movement of the triple-valve piston to the release position; and a supplemental reservoir connected to the train-pipe through the instrumentality of said valve-casing, *h*, and whose communication with said train-pipe is established by the valve of said casing, as set forth.

5. In a railway air-brake system, the combination with a triple valve, train-pipe, and auxiliary reservoir, of a valve-casing, *h*, connected to the train-pipe and provided with a passage, *k*, leading from the auxiliary reservoir to the triple-valve, and also provided with a passage, *r'*, adapted to establish direct communication between the auxiliary reservoir and train-pipe; said last-named passage being provided with two opposing valve-seats and a valve, *t*, mounted between said two valve-seats and adapted to close either of the same, and spring-pressed toward that valve-seat which is nearer the train-pipe, as set forth.

6. In a railway air-brake system, the combination with a triple valve, auxiliary reservoir, and train-pipe, of a valve-casing, *h*, connected to the train-pipe, and provided with a passage, *k*, leading from the auxiliary reservoir to the triple valve, and also provided with a passage, *r'*, adapted to establish direct communication between the auxiliary reservoir and train-pipe, said last-named passage being provided with two opposing valve-seats of which that valve-seat nearer the train-pipe is of greater area than the opposite valve-seat; and a valve, *t*, mounted between said two valve-seats and adapted to close either of the same, as set forth.

7. In a railway-air-brake system, the combination with a triple valve, train-pipe, and auxiliary reservoir, of a supplemental reservoir; and a release-valve mechanism provided with means whereby the reduction of air-pressure in the auxiliary reservoir consequent upon an application of the breaks, will permit a discharge of air from said supplemental reservoir to the train-pipe when the triple valve is operated to release the brakes.

8. In a railway air-brake system, the combination with a triple-valve, train-pipe, and auxiliary reservoir, of a quick-action releasing mechanism provided with a valve; a supplemental reservoir; and means whereby the reduction of air-pressure in the auxiliary reservoir consequent upon an application of the brakes, will, when the triple valve is operated to release the brakes, act on the valve of the release mechanism and permit said valve to establish communication between the supplemental reservoir and the train-pipe.

9. In a railway air-brake system, the combination with the triple valves, train-pipe, and auxiliary reservoirs, of a quick-action release mechanism provided with means whereby a sudden and excessive reduction of air-pressure in the auxiliary reservoir of one car of the train, elsewhere than to the brake-cylinder, will automatically cause the release of the brakes on all the other cars of the train, substantially as set forth.

10. In a railway-train provided with an air-brake system, the combination with the triple valves, train-pipe, and auxiliary reservoirs, of a quick-action release mechanism connected with the auxiliary reservoirs and provided with means whereby the reduction of air-pressure in the auxiliary reservoir of one car of the train, elsewhere than to the brake-cylinder, will, independently of the main reservoir on the locomotive, automatically cause the release of the brakes on all the other cars of the train, substantially as set forth.

11. In a railway air-brake system, the combination with the triple valves, train-pipe, and auxiliary reservoirs, of a quick-action release mechanism provided with means whereby when the auxiliary reservoir of one car of the train is "bled" or has its air-pressure reduced to the atmosphere, the brakes on all the other cars of the train will be automatically released, substantially as set forth.

12. In a fluid-pressure brake, the combination with a train-pipe, auxiliary reservoir, triple valve, brake-cylinder and supplemental reservoir, of a valve device operated by an increase in train-pipe pressure for opening communication from the supplemental reservoir to the train-pipe and to the auxiliary reservoir.

13. In a fluid-pressure brake system, the combination with a train-pipe, auxiliary reservoir, triple valve, brake-cylinder and supplemental reservoir, of means operated by an increase of train-pipe pressure from a point above atmospheric pressure for opening communication from the supplemental reservoir to the train-pipe.

14. In a fluid-pressure brake system, the combination with a train-pipe, auxiliary reservoir, triple valve and brake-cylinder, of a valve device for controlling communication from the train-pipe to the auxiliary reservoir when the brakes are applied, and means operated by an increase of train-pipe pressure for supplying an additional amount of fluid to the train-pipe.

15. In a fluid-pressure brake system, the combination with a train-pipe, auxiliary reservoir, triple valve and brake-cylinder, of a valve device for controlling communication from the train-pipe to the auxiliary reservoir when the brakes are applied, and a quick-action release mechanism adapted to secure a positive and nearly simultaneous release of all the brakes throughout the train.

16. In a fluid-pressure brake system, the combination with a train-pipe, auxiliary reservoir, triple valve, brake-cylinder and supplemental reservoir, of a valve device for controlling communication from the train-pipe to the auxiliary reservoir when the brakes are applied, and means operated by an increase of train-pipe pressure for opening communication from the supplemental reservoir to the train-pipe.

17. In a fluid-pressure brake system, the combination with a train-pipe, auxiliary reservoir, triple valve, brake-cylinder and supplemental reservoir, of a valve device for controlling communication from the train-pipe to the auxiliary reservoir when the brakes are applied, and a release-valve mechanism operated by the release movement of the triple valve for opening communication from the supplemental reservoir to the train-pipe.

18. In a fluid-pressure brake system, the combination with a train-pipe, auxiliary reservoir, triple valve and brake-cylinder, of a double-seated recharging valve for controlling communication from the train-pipe to the auxiliary reservoir, the valve-seat on the trainpipe side of the valve being of greater area than the seat on the auxiliary reservoir side of the valve.

19. In an air brake system the combination with a brake cylinder, a train pipe, a service reservoir and a reinforcing reservoir, of a valve mechanism arranged to govern communication between the service reservoir, the reinforcing reservoir, the brake cylinder and the train pipe, and containing means whereby the train pipe as well as, and in larger quantity than, the service reservoir, may receive fluid from the reinforcing reservoir during a position of the valve giving full exhaust to the brake cylinder.

20. In an automatic air brake system, the combination of a train pipe, an auxiliary reservoir, a supplemental reservoir on each car of the train, a valve mechanism controlling communication between the auxiliary reservoir and the brake cylinder, and means whereby an increase in train pipe pressure will open communication between said supplemental reservoir and the train pipe for the purpose of releasing the brakes.

21. In an automatic air brake system, the combination of a train pipe, an auxiliary reservoir, a supplemental reservoir on each car of the train, a valve mechanism controlling communication between the auxiliary reservoir and the brake cylinder and controlled by variations in train pipe pressure, and means whereby a sudden and excessive increase in train pipe pressure will open communication between said supplemental reservoir and the train pipe for the purpose of releasing the brakes.

22. In a fluid pressure brake system, the combination with a train pipe, auxiliary reservoir, triple valve and brake cylinder, of means for recharging the auxiliary reservoir by an increase of air pressure in the train pipe when the brakes are applied and without releasing the brakes, and means operated by a further increase of train pipe pressure for supplying an additional amount of fluid to the train pipe.

23. In a fluid pressure brake system, the combination with a train pipe, auxiliary reservoir, triple valve and brake cylinder, of means for recharging the auxiliary reservoir by an increase of air pressure in the train pipe when the brakes are applied and without releasing the brakes, and a quick action release mechanism adapted to secure a positive and nearly simultaneous release of all the brakes throughout the train.

24. A fluid pressure brake system comprising a train pipe, a brake cylinder, an auxiliary reservoir, a triple valve, a supplemental reservoir, and an independent valve controlled by and moving simultaneously with the triple valve for controlling communication between the supplemental reservoir and the train pipe.

25. In a railway air brake system the combination of a triple valve, train pipe, brake cylinder, a supplemental reservoir, and a release valve mechanism provided with means whereby the reduction of air pressure in the triple valve casing consequent upon an application of the brakes will permit a discharge of air from said supplemental reservoir to the train pipe when the triple valve is operated to release the brakes.

In testimony whereof I have hereunto set my hand.

LEOPOLD KRIMMELBEIN.

Witnesses:

H. N. ABERCROMBIE,

S. JOHN LION.